United States Patent [19]

Antonelli et al.

[11] Patent Number: 5,310,807

[45] Date of Patent: May 10, 1994

[54] STAR POLYMERS MADE FROM MACROMONOMERS MADE BY COBALT CHAIN TRANSFER PROCESS

[75] Inventors: Joseph A. Antonelli, Riverton, N.J.; Christopher Scopazzi, Wilmington, Del.

[73] Assignee: E. I. Du Pont de Nemours and Company, Wilmington, Del.

[21] Appl. No.: 998,350

[22] Filed: Dec. 30, 1992

[51] Int. Cl.$^5$ .................. C08F 265/04; C08F 265/06; C08F 265/10

[52] U.S. Cl. .................... 525/286; 525/285; 525/288; 525/293; 525/296; 525/301; 525/303; 525/304; 525/305; 525/308; 525/268

[58] Field of Search ............... 525/285, 286, 288, 293, 525/296, 301, 303, 304, 305, 308

[56] References Cited

U.S. PATENT DOCUMENTS

| | | | |
|---|---|---|---|
| 4,558,120 | 12/1985 | Tomalia et al. | 528/363 |
| 4,568,737 | 2/1986 | Tomalia et al. | 528/332 |
| 4,587,329 | 5/1986 | Tomalia et al. | 528/363 |
| 4,659,782 | 4/1987 | Spinelli | 525/293 |
| 4,659,783 | 4/1987 | Spinelli | 525/293 |
| 4,695,607 | 9/1987 | Spinelli | 525/272 |
| 4,737,550 | 4/1988 | Tomalia | 525/418 |
| 4,794,144 | 12/1988 | Spinelli | 525/284 |
| 4,810,756 | 3/1989 | Spinelli | 525/293 |
| 5,162,426 | 11/1992 | Hazan et al. | 525/100 |

*Primary Examiner*—Vasu S. Jagannathan
*Attorney, Agent, or Firm*—Hilmar L. Fricke

[57] ABSTRACT

A polymer dispersion of a star polymer dispersed in an organic liquid; wherein the star polymer has a crosslinked core having attached thereto at least three macromonomer arms; where (1) the core is formed of monomers having at least two ethylenically unsaturated double bonds which are crosslinked with each other and the core has at least 3 free radical polymerizable sites each of which are reacted with the macromonomer; and (2) the macromonomer that forms the arms of the star polymer is formed of ethylenically unsaturated monomers that have been polymerized by free radical polymerization in the presence of a free radical polymerization initiator and a catalytic chain transfer agent containing $Co^{+2}$ to provide the macromonomer with a terminal ethylenically unsaturated group that is polymerized with the free radical polymerizable site on the core to form the star polymer.

The process for making the star polymer and coating compositions that utilize the star polymer are also part of this invention.

10 Claims, No Drawings

STAR POLYMERS MADE FROM MACROMONOMERS MADE BY COBALT CHAIN TRANSFER PROCESS

FIELD OF THE INVENTION

This invention is related to process for making star polymers and to dispersions of such star polymers.

BACKGROUND OF THE INVENTION

Star polymers are well known and have been used in coating compositions as dispersing agents, rheology control additives, adhesion promoters and the like and in plastics as impact modifiers, reinforcing additives, stiffening modifiers and the like. Star polymers are shown in Spinelli U.S. Pat. No. 4,659,783 issued Apr. 21, 1987. Star polymers made via group transfer polymerization are shown for example in Spinelli U.S. Pat. No. 4,695,607 issued Sep. 22, 1987. Dense star polymers are shown in Tomalia et al U.S. Pat. No. 4,568,737 issued Feb. 4, 1968. Star polymers have been prepared by anionic copolymerization as shown in *Journal of Polymers Science*, part C Polymer Symposia, No. 22, 145-156 (1968).

Making star polymers by via group transfer polymerization is relatively expensive and difficult. Also, the choice of monomers that can be used is limited, e.g., hydroxy or silane functional monomers can not be used directly but require the use of intermediates to block the functionality of the monomers. Conventional anionic polymerization is not difficult and is relatively inexpensive in comparison to group transfer polymerization but also has a limitation on the monomers that can be used and does not produce uniform star polymers but results in forming unwanted polymeric components with the star polymer. There is a need for an improved process for making star polymers and in particular dispersions of star polymers in which the polymer contains desired functional groups that are useful in coating compositions and plastics and that are easily made and at a relatively low cost.

SUMMARY OF THE INVENTION

A polymer dispersion of a star polymer dispersed in an organic liquid; wherein the star polymer has a crosslinked core that has attached thereto at least three arms and each arm is a macromonomer; where
(1) the core is formed of monomers having at least two ethylenically unsaturated double bonds which are crosslinked with each other and the core has at least 3 free radical polymerizable sites each of which are reacted with the macromonomer; and
(2) the macromonomer that forms the arms of the star polymer is formed of ethylenically unsaturated monomers that have been polymerized by free radical polymerization in the presence of a free radical polymerization initiator and a catalytic chain transfer agent containing $Co^{+2}$ to provide the macromonomer with a terminal ethylenically unsaturated group that is polymerized with the free radical polymerizable site on the core to form the star polymer;
wherein the star polymer contains about 10-90% by weight of core and correspondingly about 90-10% by weight arms.

The process for making the star polymer and coating compositions that utilize the star polymer are also part of this invention.

DETAILED DESCRIPTION OF THE INVENTION

The star polymer dispersion of this invention is readily formed by an economical process that can be carried out in conventional equipment and does not require expensive catalysts or other constituents. A variety of functional groups can be incorporated into the polymer making it useful in many types of coating compositions to improve application rheology, improve stability of the composition, improve finish hardness and toughness and the like. The polymer particles of the star polymer dispersion are very small and do not cause a haze or a cloud when added to a clear coating composition which is important to users since user often equate clarity of the coating composition in the container to film clarity after application.

The process used for making the star polymer dispersion has the following steps:
(1) macromonomers are formed in an organic liquid in the presence of a free radical polymerization initiator and a catalytic chain transfer agent containing $Co^{+2}$ by polymerizing at about 80°-140° C. for about 5-10 hours ethylenically unsaturated monomers preferably, at least 1% of the ethylenically unsaturated monomers contain a reactive group such as hydroxyl, anhydride, acid, glycidyl, amine, amide, isocyanate, or silane; macromonomers are formed with each containing an ethylenically unsaturated group and have a weight average molecular weight of about 1,000-40,000 and preferably 4,000-20,000 determined by gel permeation chromatography using polystyrene as the standard;
(2) the macromonomers in the organic liquid are polymerized at about 80°-150° C. for about 1-5 hours with monomers having at least two ethylenically unsaturated double bonds in the presence of a polymerization catalyst where the monomers react with each other to form the crosslinked core of the star polymer and the core has at least 3 ethylenically unsaturated sites that are polymerized with the macromonomer to form the arms of the star polymer which is dispersed in the organic liquid; the resulting dispersion typically has a solids content of about 10-90%.

Preferably the star polymer contains about 10-50% by weight of core and correspondingly about 50-90% by weight of macromonomer arms.

The chain transfer agent used to form the macromonomers of the star polymer of the invention can be any compound which contains $Co^{+2}$. Cobalt chelates are preferred, especially those described in U.S. Pat. No. 4,680,352 to Janowicz and Melby and U.S. Pat. No. 4,722,984 to Janowicz. Most preferred are pentacyanocobaltate (II) diaquabis(borondifluorodimethylglyoximato)cobaltate (II) and diaquabis(borondifluorodiphenylglyoximato)cobaltate (II). The chain transfer agent generally is used at concentration of about 5-150 ppm based on the monomers.

Typical polymerization initiators that are used to form the macromonomer are azo initiators such azobisisobutyronitrile, 1,1-azobis(cyanocyclohexane), azobiscyclohexanecarbonitrile and the like; peroxide initiators such as hydrogen peroxide, benzoyl peroxide and other initiators such as t-butyl peroctoate, t-butyl peracetate, and the like.

Typical monomers used to form the macromonomer are for example, alkyl acrylates and methacrylates each having 1–12 carbon atoms in the alkyl group such as methyl acrylate, ethyl acrylate, propyl acrylate, butyl acrylate, pentyl acrylate, hexyl acrylate, 2-ethylhexyl acrylate, nonyl acrylate, lauryl acrylate, methyl methacrylate, ethyl methacrylate, propyl methacrylate, butyl methacrylate, pentyl methacrylate, hexyl methacrylate, 2-ethylhexyl methacrylate, nonyl methacrylate, lauryl methacrylate and the like, styrene, alpha methyl styrene and any mixtures of the above monomers.

Preferably, at least 1% by weight and up to 40% by weight of the monomers that are used to form the macromonomer have reactive group such as hydroxyl, anhydride, acid including carboxyl, glycidyl, amine, amide, isocyanate and silane. Typical ethylenically unsaturated monomers having a reactive group that are used to form the macromonomer are glycidyl acrylate, glycidyl methacrylate, ethylenically unsaturated monocarboxylic acids such as acrylic acid and methacrylic acid, ethylenically unsaturated dicarboxylic acids such as maleic acid and fumeric acid, anhydrides of ethylenically unsaturated acids such as itaconic anhydride and maleic anhydride, hydroxy alkyl acrylates and methacrylates having 1–4 carbon atoms in the alkyl group such as hydroxy methyl acrylate, hydroxy ethyl acrylate, hydroxy propyl acrylate, hydroxy butyl acrylate, hydroxy methyl methacrylate, hydroxy ethyl methacrylate, hydroxy propyl methacrylate, hydroxy butyl methacrylate and the like, acrylamide, methacrylamide, methylol acrylamide, methylol methacrylamide, ethylenically unsaturated silanes such as gamma trimethoxy silyl propyl methacrylate or acrylate, ethylenically unsaturated isocyanates such isocyanato ethyl methacrylate, isocyanato ethyl acrylate, methacryol isocyanate, substituted amino alkyl methacrylates and acrylates such as t-butyl amino ethyl methacrylate and acrylate, diethylamino ethyl methacrylate and acrylate and the like.

Typical monomer that have at least two ethylenically unsaturated groups that form the crosslinked core of the star polymer are for example ethylene dimethacrylate, 1,3-butylene dimethacrylate, tetraethylene glycol dimethacrylate, triethylene glycol dimethacrylate, trimethylolpropane trimethacrylate, 1,6-hexylene dimethacrylate, 1,4-butylene dimethacrylate, ethylene diacrylate, 1,3-butylene diacrylate, tetraethylene glycol diacrylate, triethylene glycol diacrylate, trimethylolpropane triacrylate, 1,6-hexylene diacrylate, 1,4 butylene diacrylate, pentaaerythritol tetraacrylate or methacrylate and the like.

Other monomers that can be used to form the core are any of the aforementioned alkyl methacrylates, alkyl acrylates, syrene, alpha methyl styrene, acrylonitrile, glycidyl acrylate and methacrylates.

Typical polymerization initiators that are used to form the core are same as those mentioned above that are used to form the macromonomer.

The star polymer dispersion can be added to conventional coating compositions to improve or modify the rheology or physical properties of these compositions. The resulting coating composition can contain 1–50% by weight, based on the weight of the binder, of the star polymer. Typically these coating composition have a binder solid content of about 20–80% solids in a liquid carrier. Typical polymeric binders of these coating compositions include acrylic polymers, acrylourethanes polymers, polyesters, polyesterurethanes, epoxy resins, epoxy ester resins and the like.

In addition to uses in coating compositions, star polymers of this invention can be used as tougheners in plastic sheeting, and can be used in cast, blown, spun or sprayed applications in fiber, film sheet composite materials, multilayer coating, photopolymerizable materials, photoresists, surface active agents including soil repellants and physiologically active surfaces, adhesives, adhesion promoters, coupling agents to improve impact strength of resins, an additive to motor oils to improve viscosity index and the like.

The following examples illustrate the invention. All parts and percentages are on a weight basis unless otherwise indicated. Molecular weights are determined by gel permeation chromatography using polystyrene as a standard.

EXAMPLE 1

Preparation of Hydroxy Macromonomer

To a 5-liter glass flask equipped with an agitator, thermometer, water condenser, heating mantle and addition funnels was added 180.0 gms. isobutyl methacrylate (IBMA), 192.8 gms. 2-ethylhexyl methacrylate (2-EHMA), 30.1 gms. hydroxy ethyl methacrylate (HEMA) AND 310.2 gms. toluene and the mixture agitated and heated to reflux (130° C.) under nitrogen. While maintaining the batch at reflux a mixture of 0.37 gms. "Vazo" 88(1,1-azobis(cyanocyclohexane)), 13.8 gms. toluene, 5.7 gms. HEMA and 6.29 gms of a 0.17% solution of disaquabis(boron difluorodimethylglyoximato)cobaltate (II) in HEMA was added over a 10 minute period. This was followed by the addition of a mixture of 27.7 gms. toluene, 1.33 gms. "Vazo" 88, 128.3 gms. IBMA, 185.4 gms. 2-EHMA and 34.2 gms. HEMA to the batch over 240 minutes maintaining reflux. The batch was then held at reflux for 30 minutes followed by the addition of a solution of 0.33 gms. "Vazo" 88 in 82.8 gms. toluene over 60 minutes maintaining reflux. The batch was held at reflux for 60 minutes and then cooled to room temperature. % Weight solids was 60.8 and Gardner-Holdt viscosity at 25° C. was R. The weight average molecular was 7878 and polydispersity was 1.6 determined by gel permeation chromotography (GPC). Terminal vinyl unsaturation was in excess of 95% as determined by thermogravimetric analysis. Composition of macromonomer was 50% 2-EHMA, 40% IBMA and 10% HEMA.

Preparation of Star Polymer with the Macromonomer

To a 2-liter glass flask equipped with an agitator, thermometer, water condenser, heating mantle and addition funnels 833.0 gms. of the above prepared macromonomer solution and 322.5 gms xylene were added and the mixture agitated and heated to reflux (129° C.). 0.74 gms. of t-butyl peroctoate then were added followed by the addition of a mixture of 74.0 gms. xylene, 9.62 gms. t-butyl peroctoate and 97.2 gms. butane diol diacrylate over 30 minute period while maintaining reflux temperatures. Following a 30 minute hold period at reflux, a mixture of 74.0 gms. xylene and 2.4 gms. t-butyl peroctoate was added over 30 minutes. The batch was held at reflux for an additional 30 minutes and then cooled to room temperature. The weight solids of the resulting polymer dispersion was 45% and the Gardner-Holdt viscosity measured at 25° C. was L.

Weight average molecular weight of the star polymer was 142,261 and polydispersity was 8.0, determined by GPC. The average number of arms per star is about 23 as estimated from GPCs of the star polymer and macromonomer.

EXAMPLE 2

Preparation of Hydroxy Macromonomer

To a 5-liter glass flask equipped with an agitator, thermometer, water condenser, heating mantle and addition funnels 180.0 gms. isobutyl methacrylate (IBMA), 160.0 gms. 2-ethylhexyl methacrylate (2-EHMA), 55.1 gms. hydroxy ethyl methacrylate (HEMA) and 310.2 gms. toluene were added and the mixture was agitated and heated to reflux (130° C.) under a nitrogen atmosphere. While maintaining the batch at its reflux temperature, a mixture of 0.37 gms. "Vazo" 88(1,1-azobis(cyanocyclohexane)), 13.8 gms. toluene, 4.54 gms. HEMA and 8.77 gms. of a 0.17% solution of disaquabis(boron difluorodimethylglyoximato) cobaltate (II) in HEMA was added over 10 minute period. This was followed by the addition of a mixture of 27.7 gms. toluene, 1.35 gms. "Vazo" 88, 128.4 gms. IBMA, 150.6 gms. 2-EHMA and 77.8 gms. HEMA to the batch over 240 minutes followed by the addition of a solution of 0.33 gms. "Vazo" 88 in 82.8 gms. toluene over 60 minutes and then cooled to room temperature. % Weight solids were 59.4 and Gardner-Holdt viscosity measured at 25° C. was V. The weight average molecular was 7,313 and polydispersity 1.5 determined by GPC. Terminal vinyl unsaturation is in excess of 95% as determined by thermogravimetric analysis. Composition of macromonomer was 40% 2-EHMA, 40% IBMA and 20% HEMA.

Preparation of Star Polymer with the Macromonomer

To a 2-liter glass flask equipped with an agitator, thermometer, water condenser, heating mantle and addition funnels 263.8 gms. macromonomer solution prepared above and 135.0 gms. xylene were added and the mixture was agitated and heated to reflux (131° C.). 0.3 gms. of t-butyl peroctoate then were added followed by the addition of a mixture of 52.4 gms xylene, 3.9 gms. t-butyl peroctoate and 39.4 gms. butane diol diacrylate over 30 minutes period while maintaining reflux temperature. Following a 30 minute hold period at reflux, a mixture of 30.0 gms. xylene and 0.98 gms. t-butyl peroctoate was added over 30 minutes. The batch was held at reflux for an additional 30 minutes and then cooled to room temperature. Weight solids of the star polymer dispersion was 40% and Gardner-Holdt viscosity measured at 25° C. was G. Weight average molecular weight of the star polymer was 101,372 and polydispersity was 7.3 determined by GPC. The average number of arms per star was about 24.

EXAMPLE 3

Preparation of Star Polymer from Macromonomer of Example 2

To a 2-liter glass flask equipped with an agitator, thermometer, water condenser, heating mantle and addition funnels 324.3 gms. macromonomer solution of Example 2 and 113.7 gms. xylene were added and the mixture was agitated and heated to reflux (128° C.). 0.35 gms. of t-butyl peroctoate were added followed by the addition of a mixture of 80.8 gms. xylene, 3.53 gms. t-butyl peroctoate and 45.5 gms. 1,6-hexanediol dimethacrylate over 30 minutes while maintaining reflux temperature. Following a 30 minute hold period at reflux, a mixture of 31.1 gms. xylene and 0.87 gms. t-butyl peroctoate was added over 30 minutes. The batch was held at reflux for an additional 30 minutes and then cooled to room temperature. Weight solids of the star polymer dispersion was 40% and Gardner-Holdt viscosity measured at 25° C. was B+½. Weight average molecular weight of the star polymer was 86,898 and polydispersity was 9.4 determined by GPC.

EXAMPLE 4

Preparation of Acid Macromonomer

A solution of macromonomer of composition 50% 2-EHMA, 40% IBMA and 10% methacrylic acid was made via the procedure of Example 1. Weight average molecular was 9800 and polydispersity was 1.9. Weight solids were 44%.

Preparation of Star Polymer with Macromonomer

To a 2-liter glass flask equipped with an agitator, thermometer, water condenser, heating mantle and addition funnels 551.7 gms. macromonomer solution (prepared above) was added and agitated and heated to reflux (115° C.) 0.42 gms. of t-butyl peroctoate were added followed by the addition of a mixture of 65.6 gms. xylene, 3.85 gms t-butyl peroctoate and 38.9 gms. butane diol diacrylate over 30 minutes maintaining reflux temperature. Following a 30 minute hold period at reflux, a mixture of 124.0 gms. xylene and 0.96 gms. t-butyl peroctoate was added over 30 minutes. The batch was held at reflux for an additional 30 minutes and then cooled to room temperature followed by reduction to 30% weight solids with 148 gms. isopropanol. The Gardner-Holdt viscosity measured at 25° C. was B. Weight average molecular weight of the star polymer was 71,988 and polydispersity was 4.0 determined by GPC.

EXAMPLE 5

Preparation of Star Polymer from Macromonomer of Example 1

To a 1-liter glass flask equipped with an agitator, thermometer, water condenser, heating mantle and addition funnels 313.51 gms. macromonomer solution (prepared in Example 1) and 110 gms of xylene were added and agitated and heated to reflux (128° C.). 0.35 gms. of t-butyl peroctoate were added followed by the addition of a mixture of 86.59 gms. xylene, 3.53 gms t-butyl peroctoate and 51.9 gms. tripropylene glycol diacrylate over 30 minutes while maintaining reflux temperature. Following a 30 minute hold period at reflux, a mixture of 33.3 gms. xylene and 0.87 gms. t-butyl peroctoate were added over 30 minutes. The batch was held at reflux for an additional 30 minutes and then cooled to room temperature. The Gardner-Holdt viscosity measured at 25° C. was A1+½. Weight average molecular weight of the star polymer was 26,045 and polydispersity was 3.1 determined by GPC.

EXAMPLE 6

Preparation of Star Polymer from Macromonomer of Example 1

To a 1-liter glass flask equipped with an agitator, thermometer, water condenser, heating mantle and addition funnels 351.51 gms. macromonomer solution (prepared in Example 1) and 107.5 gms of xylene was added and agitated and heated to reflux (128° C.). 0.35 gms. of t-butyl peroctoate were added followed by the addition of a mixture of 72.34 gms. xylene, 3.53 gms t-butyl peroctoate and 36.13 gms. neopentyl glycol diacrylate over 30 minutes while maintaining reflux temperature. Following a 30 minute hold period at reflux, a mixture of 27.8 gms. xylene and 0.87 gms. t-butyl peroctoate was added over 30 minutes. The batch was held at reflux for an additional 30 minutes and then cooled to room temperature. The Gardner-Holdt viscosity measured at 25° C. was B.+½ Weight average molecular weight of the star polymer was 23,421 and polydispersity was 2.63 determined by GPC.

We claim:

1. A polymer dispersion comprising a star polymer dispersed in an organic liquid; wherein the star polymer consists essentially of a crosslinked core having attached thereto at least three arms each arm consisting of a macromonomer; where
   (1) the core consists essentially of monomers polymerized by free radical polymerization having at least two ethylenically unsaturated double bonds which are crosslinked with each other and the core has at least 3 free radical polymerizable sites each of which are reacted with the macromonomer; and
   (2) the macromonomer that forms the arms of the star polymer consists of ethylenically unsaturated monomers that have been polymerized by free radical polymerization in the presence of a free radical polymerization initiator and a catalytic chain transfer agent containing $Co^{+2}$ to provide the macromonomer having a weight average molecular weight of about 1,000–40,000 with a terminal ethylenically unsaturated group that is polymerized with the free radical polymerizable site on the core to form the star polymer; and
wherein the star polymer consists essentially of about 10–90% by weight of the core and correspondingly about 90–10% by weight of the arms.

2. The polymer dispersion of claim 1 in which at least 1% and up to 40% by weight of the polymerized ethylenically unsaturated monomers of the macromonomer contain a reactive group selected from the group consisting of hydroxyl, anhydride, acid, glycidyl, amine, amide, isocyanate, and silane.

3. The polymer dispersion of claim 2 in which the chain transfer agent is a cobalt chelate.

4. The polymer dispersion of claim 3 in which the chelate is selected from the group consisting of pentacyanocobaltate(II), diaquabis(borondifluorodimethylglyoximato)cobaltate and glyoximatocobaltate(II).

5. The polymer dispersion of claim 2 in which the ethylenically unsaturated monomers used to form the macromonomer are selected from the group consisting of alkyl methacrylates, alkyl acrylates, each having 1–12 carbon atoms in the alkyl group, styrene and any mixtures thereof and the ethylenically unsaturated monomers containing reactive groups are selected from the group consisting of glycidyl methacrylate, glycidyl acrylate, ethylenically unsaturated monocarboxylic acids, anhydrides of ethylenically unsaturated acids, ethylenically unsaturated silanes, hydroxy alkyl acrylates, hydroxy alkyl methacrylates, substituted amino alkyl methacrylates, substituted amino alkyl acrylates each having 1–4 carbon atoms in the alkyl group, acrylamide, methacrylamide, methylol acrylamide, methylol methacrylamide and ethylenically unsaturated isocyanates.

6. The polymer dispersion of claim 2 in which the star polymer consists essentially of a crosslinked core of alkylene diol diacrylate and arms of macromonomer of an alkyl methacrylate having 1–12 carbon atoms in the alkyl group and a hydroxy alkyl methacrylate having 1–4 carbon atoms in the alkyl group.

7. The polymer dispersion of claim 6 in which the star polymer consists essentially of a crosslinked core of butane diol diacrylate, tripropylene glycol diacrylate or neopentyl glycol diacrylate and arms of macromonomer of isobutyl methacrylate, ethylhexyl methacrylate and hydroxy ethyl methacrylate.

8. The polymer dispersion of claim 2 in which the star polymer consists essentially of a crosslinked core of alkylene diol diacrylate and arms of alkyl methacrylate having 1–12 carbon atoms in the alkyl group and an ethylenically unsaturated carboxylic acid.

9. The polymer dispersion of claim 8 in which the star polymer consists essentially of a crosslinked core of butane diol diacrylate and arms of isobutyl methacrylate, 2-ethylhexyl methacrylate, and methacrylic acid.

10. The polymer dispersion of claim 1 in which the monomers of the core are selected from the group consisting of alkylene dimethacrylates, alkylene diacrylates, alkylene polyacrylates, alkylene diol dimethacrylates and alkylene diol diacrylates.

* * * * *